Figure 1:
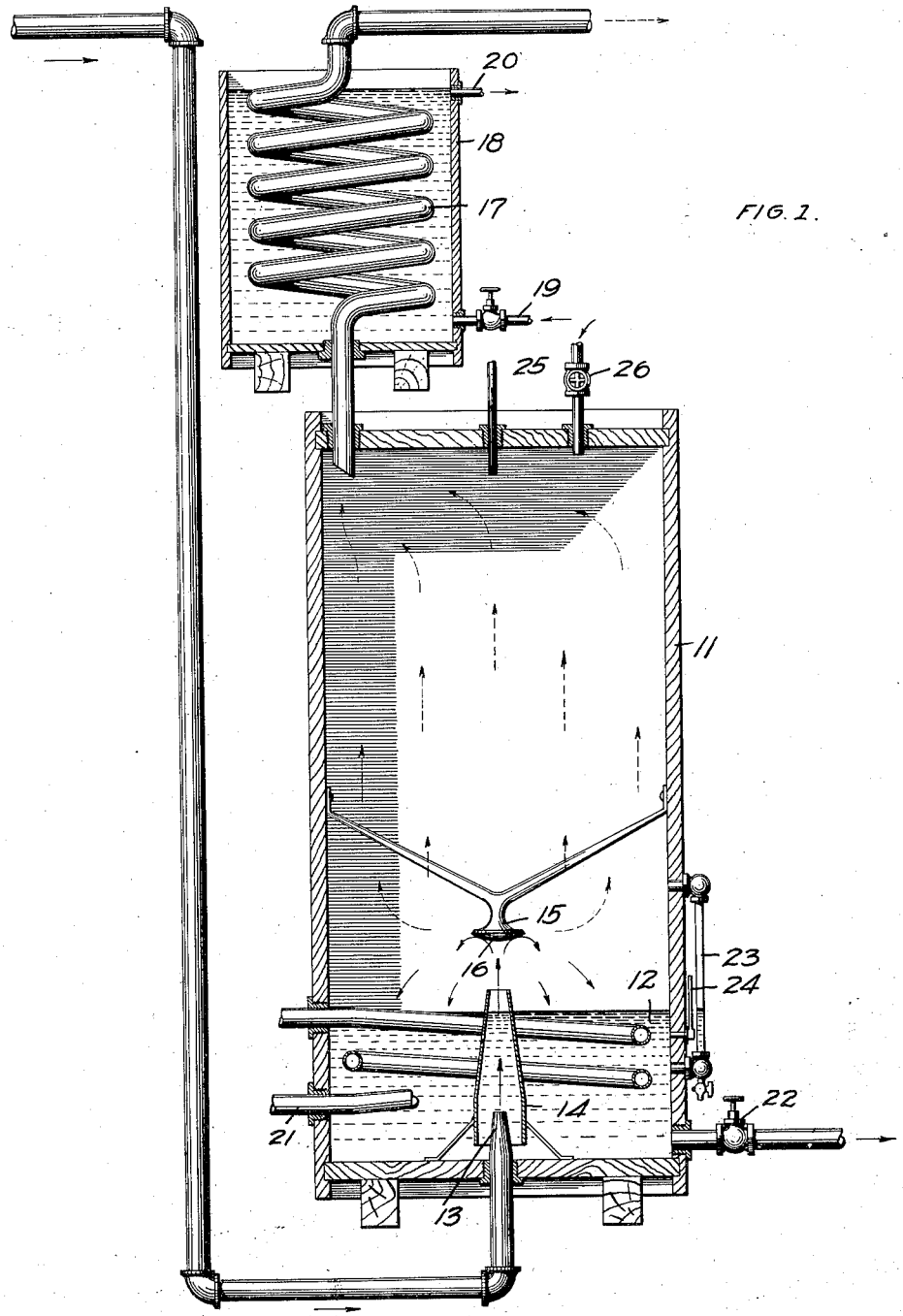

May 5, 1925.

E. H. WESTLING

ABSORPTION PROCESS

Filed June 12, 1922

1,536,463

2 Sheets-Sheet 2

WITNESS:
H. Sherburne

INVENTOR.
ERIC H. WESTLING.
BY
his ATTORNEYS.

Patented May 5, 1925.

1,536,463

UNITED STATES PATENT OFFICE.

ERIC HJALMAR WESTLING, OF REDWOOD CITY, CALIFORNIA.

ABSORPTION PROCESS.

Application filed June 12, 1922. Serial No. 567,733.

*To all whom it may concern:*

Be it known that I, ERIC HJALMAR WESTLING, a citizen of the United States, and a resident of Redwood City, in the county of San Mateo and State of California, am the inventor of a new an useful Absorption Process, of which the following is a specification.

My invention relates to the absorpition and condensation of gases or vapors in a fluid or liquid, such as is necessary for example in the production of nitric acid or sulphuric acid. Such absorption however is a step in a great many other chemical and physical processes, and my invention is generally applicable to all of them.

One of the objects of my invention is to render possible the rapid and efficient absorption of gases or the like in a liquid.

Another object of my invention is to cause such absorption to taken place while the liquid is in a finely divided state so as to present a relatively large surface to the gases.

Still another object of my invention is to provide for the atomization of the gases so that the liquid may the more readily be condensed after the absorption has taken place.

The invention possesses other advantageous features, some of which, with the foregoing, will be set forth at length in the following description where I shall outline in full those embodiments of the invention which I have selected for illustration in the drawings accompanying and forming part of the present specification. In the drawings, I have shown several forms of the apparatus of my invention, but it is to be understood that I do not limit myself to those forms, since the invention as expressed in the claims may be embodied in other forms as well.

Figure 2:
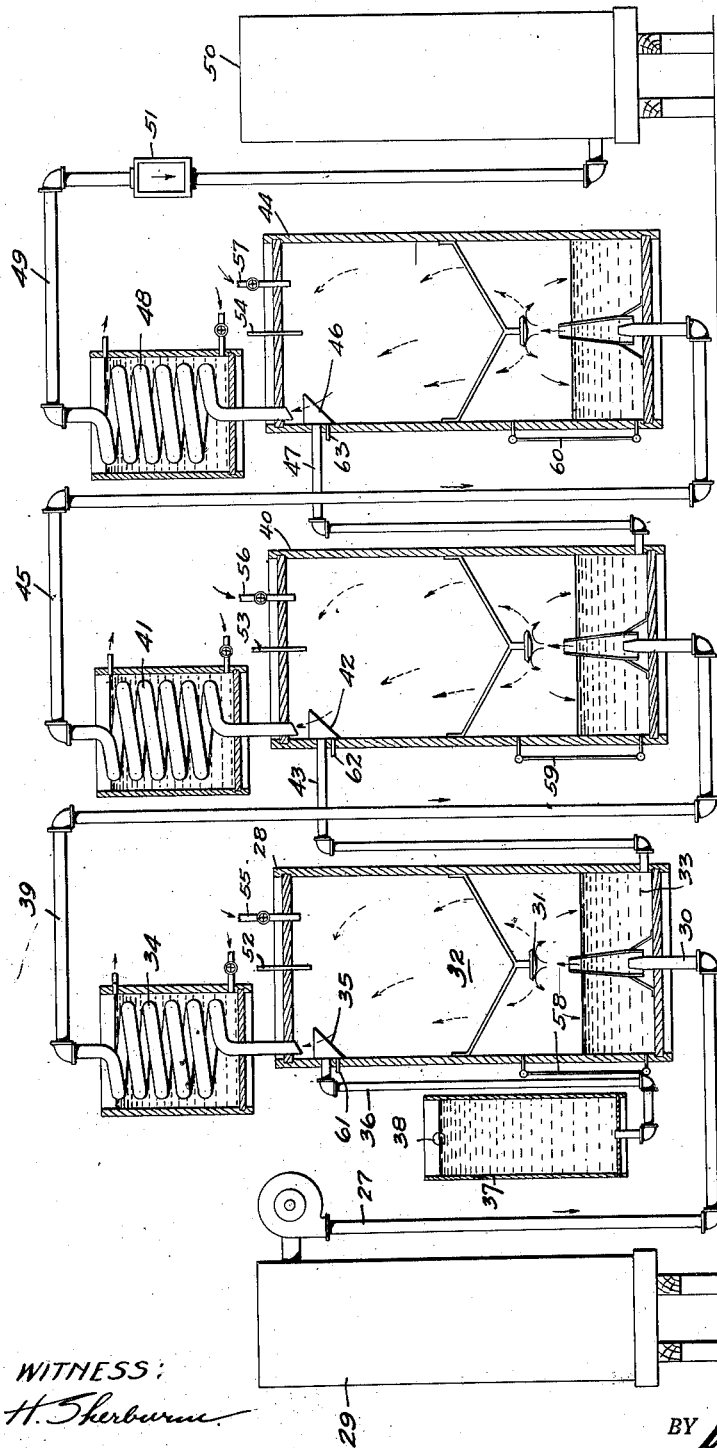

Referring to the drawings:

Figure 1 is a view, mainly diagrammatic, of one form of apparatus embodying my invention; and Fig. 2 is a modification.

In the modification shown in Fig. 1, there is a tower 11, within which the absorption and condensation takes place. The operation of the tower will be described in connection with the production of nitric acid by the conversion of nitric fumes in the presence of oxygen and water. The summary of the reactions is

The stages of this reaction are well known and need not be described.

Within the tower 11 there is a small quantity of water or weak acid 12. The incoming mixture of air and nitric fumes pass through the inlet or nozzle 13, the opening of which is below the level of the liquid 12. It is surrounded by a pipe 14 supported from the bottom of tower 11, through which pipe the liquid 12 is propelled by the gas. The nozzle 13 is directed toward a baffle plate 15. This plate has a lower surface 16 shown as convex, but it may, if desired, be concave or flat. The mixture of gas and liquid, which has appreciable kinetic energy, is thrown with considerable force from the nozzle 13 against the lower surface 16, and is shattered into a fine spray or fog of minute liquid particles. This fog represents a very large surface of contact between the gas and the liquid and for this reason chemical action and absorption are facilitated. There is also an atomizing effect upon the gas due to the impact upon the baffle plate 15. This ionization assists the condensation into fog, since it serves to overcome the surface tension to the liquid.

The acid fog and unabsorbed gases and vapors enter the cooling and spray collection coil 17 located above the tower 11. This mixture follows the convolutions of the turns; and the consequent changes in direction of flow, together with the inertia of the globules, acts in a way similar to centrifugal force. Thus the liquid or weak acid is separated from the gas and returns to the bottom of tower 11, while the residual gas is discharged. The coil 17 may, if desired, be located in a tank 18, provided with water through inlet 19, and having an outlet at 20. This water may serve to cool or heat the coil, depending upon the use to which the entire apparatus is put. For the production of nitric acid, cooling water is required.

The process hereinbefore described is continuous, and is prolonged until the acid 12 is sufficiently strong for the desired purpose. No moving machine is needed in the process, nor fine slots or openings which would be likely to become clogged by sediment, enlarged by corrosion, or otherwise be disadvantageously affected by the operation of the device.

It may be necessary at times to regulate the temperature of the acid 12 within the tower 11, and for this purpose, a coil 21 is provided through which either a heating or a cooling fluid may pass. At the bottom of the tank a valve 22 is located for drawing off the finished product. A gauge glass 23 indicates the amount of liquid in the tower, while a thermometer 24 may be used for determining its temperature.

The active absorption space above the baffle plate 15 takes up the greater part of the space in the tower. Leading into the top of this space are the inlet valves 25 and 26, for the admission respectively of weak acid and air under pressure, when desirable.

It is of course possible to continue an absorption and condensation process through a plurality of towers, such as 11. One instance in which this is desirable is in the manufacture of sulphuric acid by the so-called lead-chamber process. With this process, sulphur dioxide gas is absorbed, in the presence of nitrogen oxides and oxygen by water to form sulphuric acid. An arrangement for effecting this result by a plurality of towers such as 11 is represented in Fig. 2.

In this figure, the pipe 27 serves to convey the mixture of gases, $SO_2$, air and nitric oxides into the chamber formed in the first tower 28. This mixture is pumped through the pipe 27 from the Glover tower 29, where it has served to concentrate and de-nitrate Gay-Lussac tower acid and weak acid, in a well-known manner. The tower 28 is similar to the tower 11 hereinbefore described, its essential features being a nozzle 30, a baffle plate 31, and an active absorption space 32 above the baffle plate. Water or weak acid 33 fills the lower part of the tower. Some of the fog or spray formed by the stream of liquid and vapor hitting the baffle plate is condensed in the coil 34, the remainder falling back as a rain to the bottom of the tower. The condensed acid falls from the coil 34 into the trough 35, whence it is conducted by pipe 36 to a collecting vessel 37, from which it may run into a stock tank through the overflow pipe 38. The height of the collecting vessel and its position with relation to the absorption tower is such that the liquid in the pipe 36 forms a safe liquid lock against the pressure in the tower.

The gases that have not been absorbed pass through the coil 34 and pipe 39 to a second tower 40, substantially similar to tower 28. The condensation from the coil 41, however, passes through trough 42 and pipe 43 to the bottom of tower 28.

A third tower 44 similar to the tower 40 receives the uncondensed vapors from coil 41 through pipe 45, where the same process is repeated, the condensed acid being lead through trough 46 and pipe 47 to the bottom of tower 40. As many towers may be used as necessary for the complete absorption of the sulphur dioxide. From the last condensing coil 48, gases which consist mainly of nitric fumes, residual nitrogen and a small part of excess oxygen, pass through pipe 49 to the Gay-Lussac tower 50. This tower serves to absorb the nitric fumes, which are later liberated for use in the Glover tower 29. A lantern 51 may be inserted in pipe 49 to read the color of the gases flowing to the Gay-Lussac tower 50.

The control of the process is facilitated by the provision of such instruments as the thermometers 52, 53 and 54 projecting into the absorption chambers. Water pipes 55, 56 and 57 and gauge glasses 58, 59 and 60, also assist in the manipulation. Other instrumentalities, such as heating or cooling devices, may also be used whenever desirable.

Although I have shown a Gay-Lussac tower 50 for absorbing the nitric fumes, it is possible to relieve it of at least a larger part of its work. This is due to the employment of the counter current principle. The acid produced in tower 44 is comparatively rich in nitric oxides, and as it is returned to the preceding tower 40, these nitric oxides are reintroduced. In a similar manner the acid produced in tower 40 and returned to tower 28 carries with it nitric oxides. In this way, these oxides are made use of again and again without the necessity of employing Gay-Lussac and Glover towers as large as have been heretofore used. Absorption towers, as disclosed in Fig. 1, may be employed to serve the functions of Gay-Lussac and Glover towers.

Representative samples of the product may easily be obtained at drips 61, 62 and 63, and since these samples truly represent the condition of the system just before the samples were taken, a quick control of the entire process results.

The apparatus is compact and inexpensive to install. When used for the manufacture of sulphuric acid, the need of supplying steam to the chambers is obviated, and for this reason the upkeep expense is lowered.

I claim:

1. The process of absorbing gases or vapors in liquids which consists in introducing the gas into a body of the liquid and causing the kinetic energy of the gas to convert the liquid into a fog and condensing the fog.

2. The process of absorbing gases or vapors in liquids which consists in forcing a mixture of the gases or vapors and the liquid in relatively large masses against a surface so as to shatter the relatively large masses of the liquid into fine particles and condensing these fine particles.

3. The process of absorbing gases or vapors in liquids which consists in shattering a mixture of the gases or vapors and the liquid into a fine fog, and condensing the fog.

4. The process of absorbing gases or vapors in liquids which consists in directing a stream of the mixture of gases or vapors and the liquids against a surface with such force as to shatter the mixture into a fine fog, and condensing the fog.

5. The process of manufacturing sulphuric acid, which consists in conducting a mixture of sulphur dioxide and nitric fumes into water contained in a chamber, causing the knietic energy of the gases to direct a stream of the mixture of gases and water against a surface in the chamber so as to shatter the water into fine particles, and condensing the particles.

6. The process of manufacturing sulphuric acid which consists in successively passing a mixture of sulphur dioxide and nitric fumes through water contained in a plurality of chambers, causing the knietic energy of the gases in each chamber to produce a stream of the mixture of gases and the water and project said stream against a surface so as to shatter the water into a fine fog, condensing the fog and permitting the condensed material to flow to the next preceding chamber from all chambers after the first, and into a receiving tank from the first chamber.

7. The process of absorbing gases in fluids which consists in forcibly discharging the gas through fluid contained in a chamber whereby the fluid is projected in a stream against a surface whence it discharges in a spray.

8. The process of absorbing gases in fluids which consists in forcibly discharging the gas into a chamber containing fluid and causing the discharging gas to produce a fog of the fluid within the chamber.

9. The process of absorbing gases in fluids which consists in bringing the gas into contact under pressure with a fog of the fluid produced by forcibly discharging the gas through the fluid.

10. The process of absorbing gases in fluids which consists in forcibly discharging gas into a chamber having a constricted outlet, employing the kinetic energy of the discharging gases to produce a fog of the fluid and condensing the fog.

In testimony whereof, I have hereunto set my hand.

ERIC HJALMAR WESTLING.